(12) United States Patent
Wang et al.

(10) Patent No.: US 8,773,354 B2
(45) Date of Patent: Jul. 8, 2014

(54) METHOD UTILIZED IN THREE-DIMENSIONAL POINTING SYSTEM

(75) Inventors: Guo-Zhen Wang, Hsin-Chu (TW);
Shuan-Yu Tung, Hsin-Chu (TW);
Ming-Ching Ma, Hsin-Chu (TW);
Hung-Wei Tseng, Hsin-Chu (TW);
Yi-Pai Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 337 days.

(21) Appl. No.: 13/279,332

(22) Filed: Oct. 24, 2011

(65) Prior Publication Data

US 2012/0105321 A1   May 3, 2012

(30) Foreign Application Priority Data

Nov. 2, 2010   (TW) .............................. 99137695 A

(51) Int. Cl.
*G09G 5/08* (2006.01)

(52) U.S. Cl.
USPC .......................................... 345/157; 345/156

(58) Field of Classification Search
USPC .................................................. 345/156–172
See application file for complete search history.

(56) References Cited

U.S. PATENT DOCUMENTS

| 7,499,027 | B2 | 3/2009 | Brigham, II | |
| 2006/0244719 | A1* | 11/2006 | Brigham et al. | 345/156 |
| 2008/0180396 | A1 | 7/2008 | Lin | |
| 2010/0149135 | A1* | 6/2010 | Park et al. | 345/179 |

FOREIGN PATENT DOCUMENTS

| CN | 100590673 C | 2/2010 |
| TW | 201007520 | 2/2010 |

* cited by examiner

*Primary Examiner* — Premal Patel
(74) *Attorney, Agent, or Firm* — Winston Hsu; Scott Margo

(57) ABSTRACT

A method utilized in a three-dimensional pointing system is provided according to the present invention. The three-dimensional pointing system includes a pointing device, a sensor array, and a display panel, wherein the sensor array is embedded within the display panel. The pointing device projects a pointer onto the display panel to form a projection image, and the sensor array accordingly generates a sensed image which includes the projection image. The method determines at least one space status information based on the sensed image.

14 Claims, 14 Drawing Sheets

$$D \begin{pmatrix} a_1 & a_2 & a_3 & a_4 & a_5 & a_6 & a_7 \\ a_8 & a_9 & a_{10} & a_{11} & a_{12} & a_{13} & a_{14} \\ a_{15} & a_{16} & a_{17} & a_{18} & a_{19} & a_{20} & a_{21} \\ a_{22} & a_{23} & a_{24} & [a_{25}] & a_{26} & a_{27} & a_{28} \\ a_{29} & a_{30} & a_{31} & a_{32} & a_{33} & a_{34} & a_{35} \\ a_{36} & a_{37} & a_{38} & a_{39} & a_{40} & a_{41} & a_{42} \\ a_{43} & a_{44} & a_{45} & a_{46} & a_{47} & a_{48} & a_{49} \end{pmatrix} \times \begin{matrix} A \\ \\ \\ \\ \\ B \\ \\ \\ \\ \\ C \end{matrix} \begin{pmatrix} 0 & 0 & 0 & 1 & 0 & 0 & 0 \\ 0 & 0 & 0 & 1 & 0 & 0 & 0 \\ 0 & 0 & 0 & 1 & 0 & 0 & 0 \\ 0 & 0 & 0 & 1 & 0 & 0 & 0 \\ 0 & 0 & 0 & 1 & 0 & 0 & 0 \\ 0 & 0 & 0 & 1 & 0 & 0 & 0 \\ 0 & 0 & 0 & 1 & 0 & 0 & 0 \end{pmatrix}$$

$\theta = 0°$ $$\begin{pmatrix} 0 & 0 & 0 & 0 & 1 & 0 & 0 \\ 0 & 0 & 0 & 1 & 0 & 0 & 0 \\ 0 & 0 & 0 & 1 & 0 & 0 & 0 \\ 0 & 0 & 1 & 0 & 0 & 0 & 0 \\ 0 & 0 & 1 & 0 & 0 & 0 & 0 \\ 0 & 1 & 0 & 0 & 0 & 0 & 0 \\ 1 & 0 & 0 & 0 & 0 & 0 & 0 \end{pmatrix}$$

$\theta = 40°$ $$\begin{pmatrix} 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 1 & 1 & 1 & 1 & 1 & 1 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix}$$

$\theta = 90°$

FIG. 6

METHOD UTILIZED IN THREE-DIMENSIONAL POINTING SYSTEM

BACKGROUND OF THE INVENTION

1. Field of the Invention

The present invention relates to a three-dimensional (3D) pointing system, and more particularly, to a method utilized in a 3D pointing system for determining a position of a pointing device in the 3D pointing system.

2. Description of the Prior Art

Pointing system generally provides a user input and information related to space status to a computer or an electronic device. Traditionally, the types of pointing systems include a mouse, a trace ball, a touch panel, etc. In order to provide a more intuitive pointing system for the user, the present related technology has developed a 3D pointing structure which detects the user's body motion by utilizing a camera or a tracking sensor, and utilizes the detected motion as the user input. However, the conventional structures often have some accompanying limitations. For example, the user has to stay in the sensing area of the camera or the tracking sensor such that the body motion is capable of being detected accurately. Moreover, the size of the pointing device is comparatively large and is generally disposed at a position near the display device, which increases the size of the display device inevitably.

On the other hand, the conventional 3D pointing structures are lack of accuracy and efficiency on estimating the space information input by the user. Therefore, the conventional technologies still have room for improvement.

SUMMARY OF THE INVENTION

Accordingly, the present invention provides a method utilized in a 3D pointing system for determining a position and related space status information of a pointing device within the 3D pointing system.

According to an exemplary embodiment of the present invention, an exemplary method utilized in a 3D pointing system is provided. The 3D pointing system includes a pointing device, a display panel and a sensor array. The sensor array is embedded within the display panel. The exemplary method determines at least one space status information corresponding to the pointing device. Moreover, the exemplary method includes: utilizing the pointing device to project a pointer onto the display panel to form a projection image; utilizing the sensor array to generate a sensed image that includes the projection image, wherein the sensed image includes a plurality of pixels; calculating a plurality of sum of pixels value of various sensing areas and the maximum value of the sum is obtained. The first sensed value is decided by the maximum value of the sum. Determining a first dimensional information and a second dimensional information of the at least one space status information according to the plurality of first sensed values. The first dimensional information and the second dimensional information are at the center of the first sensed value.

Preferably, the exemplary method further includes: establishing a second sensing area within the sensed image according to the first dimensional information and the second dimensional information; adjusting the size of the second sensing area, determining a third dimensional information of the at least one space status information according to a variation of a second sensed value within the second sensing area.

Preferably, the exemplary method further includes: determining a plurality of third sensing areas with a rotation relationship within the sensed image according to the first dimensional information and the second dimensional information; generating a plurality of sensed values respectively corresponding to the plurality of third sensing areas; determining a rotation information of the at least one space status information according to the plurality of third sensed values.

Preferably, the exemplary method further includes: determining a tilt information of the at least one space status information according to a geometry ratio corresponding to the projection image within the sensed image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is another concept diagram illustrating how to determine the rotation information with the method of the present invention.

DETAILED DESCRIPTION

Figure 1:
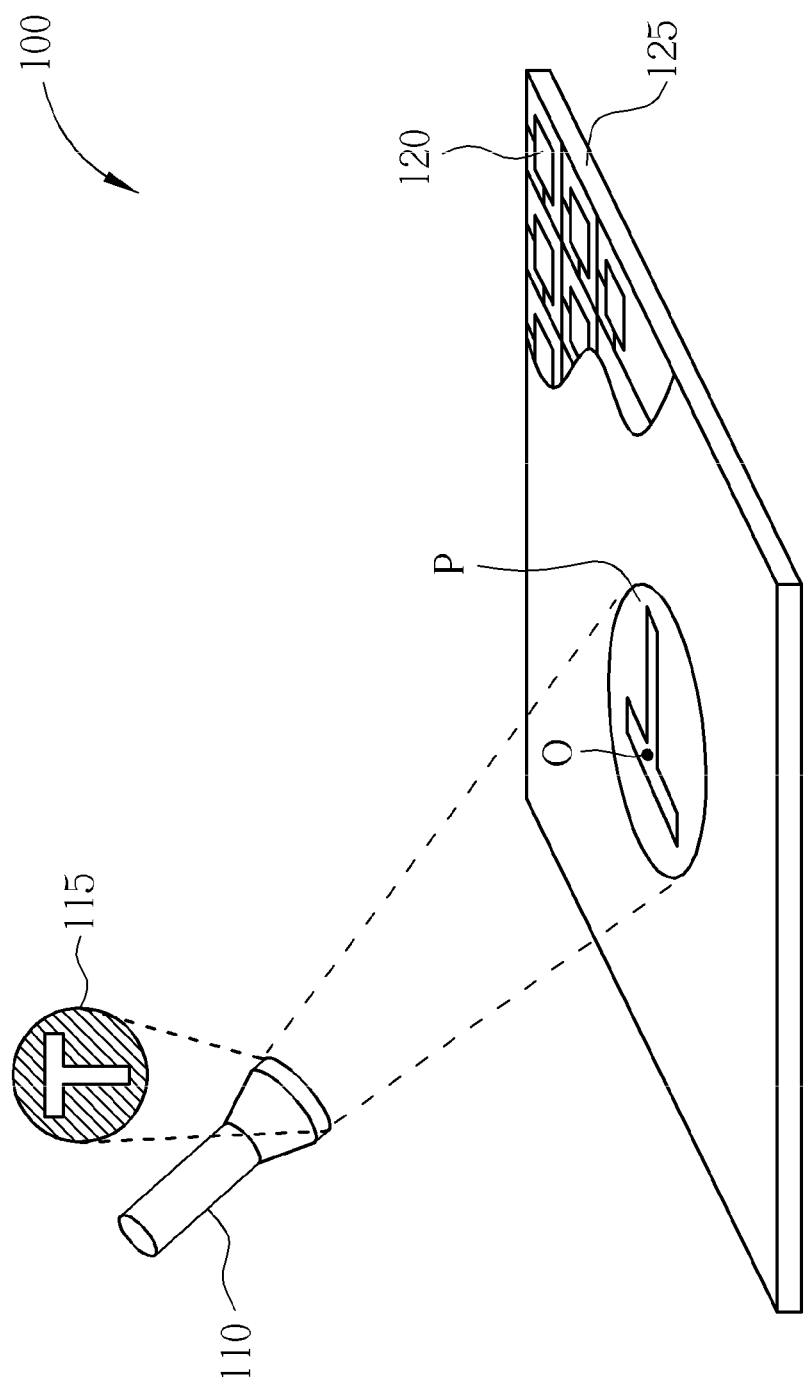
FIG. 1 is a structure diagram illustrating a 3D pointing system employing the method of the present invention.

The concept of the present invention is described hereinafter with reference to different exemplary embodiments and related figures. The components that have the same reference numeral in different figures are substantially the same. So, repeated description is omitted in the following. Moreover, the different technical features mentioned in different exemplary embodiments are not limited to the exemplary embodiments only. In fact, in a reasonable scope of the present invention, an exemplary embodiment with a proper modification may have specific technical features of other exemplary embodiments.

Besides, to allow the reader to understand the concept of the present invention clearly, the following description illustrates the details of the present invention by some specific values; however, the values and the processes and results corresponding to the values merely represent one possible implementation of the present invention, and are not meant to be limitations of the present invention.

Please refer to FIG. 1, which is a structure diagram illustrating a 3D pointing system employing the method of the present invention. As shown in the figure, the 3D pointing system 100 includes a pointing device 110 and a sensor array 120. The sensor array 120 is embedded within a display panel 125, and therefore forms a sensing system. Preferably, the sensor array 120 substantially forms a plane parallel with a display plane of the display panel 125. The pointing device 110 generates a projection beam for projecting a pointer 115 with a specific pattern onto the display panel 125 to form a projection image P. In practice, a user may hold the pointing device 110 and input specific control information via shaking or rotating the pointing device 110. Consequently, different projection images P are formed on the display panel 125. The method of the present invention determines position and status (e.g., tilt or rotation) of the pointing device 110 in the space by the projection image P. Next, analyzing the related information may understand the control information the user inputs.

Figure 8:
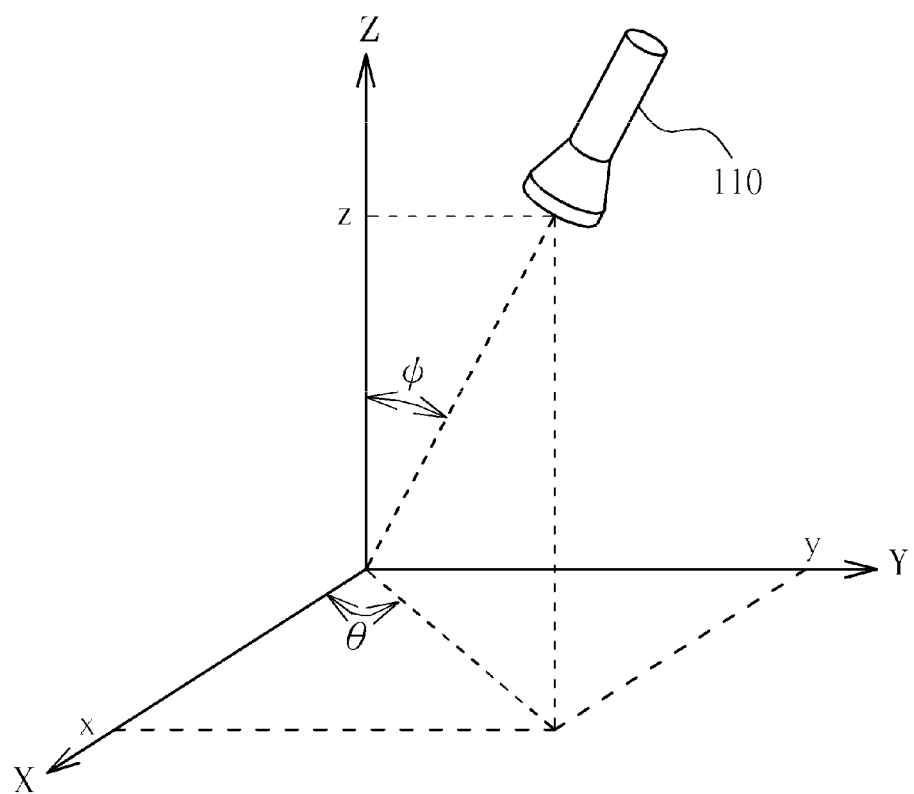
FIG. 8 is a diagram illustrating space and status relationships determined by the method of the present invention.

The method of the present may be performed by a processing device (not shown) in a software or hardware manner. The processing device determines space status information corresponding to the pointing device 110 according to the sensed information (e.g., an output sensed image) generated by the sensor array 120, wherein the space status information may include first dimensional information X, second dimensional information Y, third dimensional information Z, rotation information θ, and tilt information φ. Please refer to FIG. 8 for the relationship of the different space status information. The first dimensional information X, the second dimensional information Y, and the third dimensional information Z represent a corresponding position of the pointing device 110 within the Cartesian coordinate system. The rotation information θ represents an included angle between a projection of the pointing device 110 mapped onto the XY plane and the X axis. The tilt information φ represents an included angle between the pointing device 110 and the Z axis.

Figure 2:
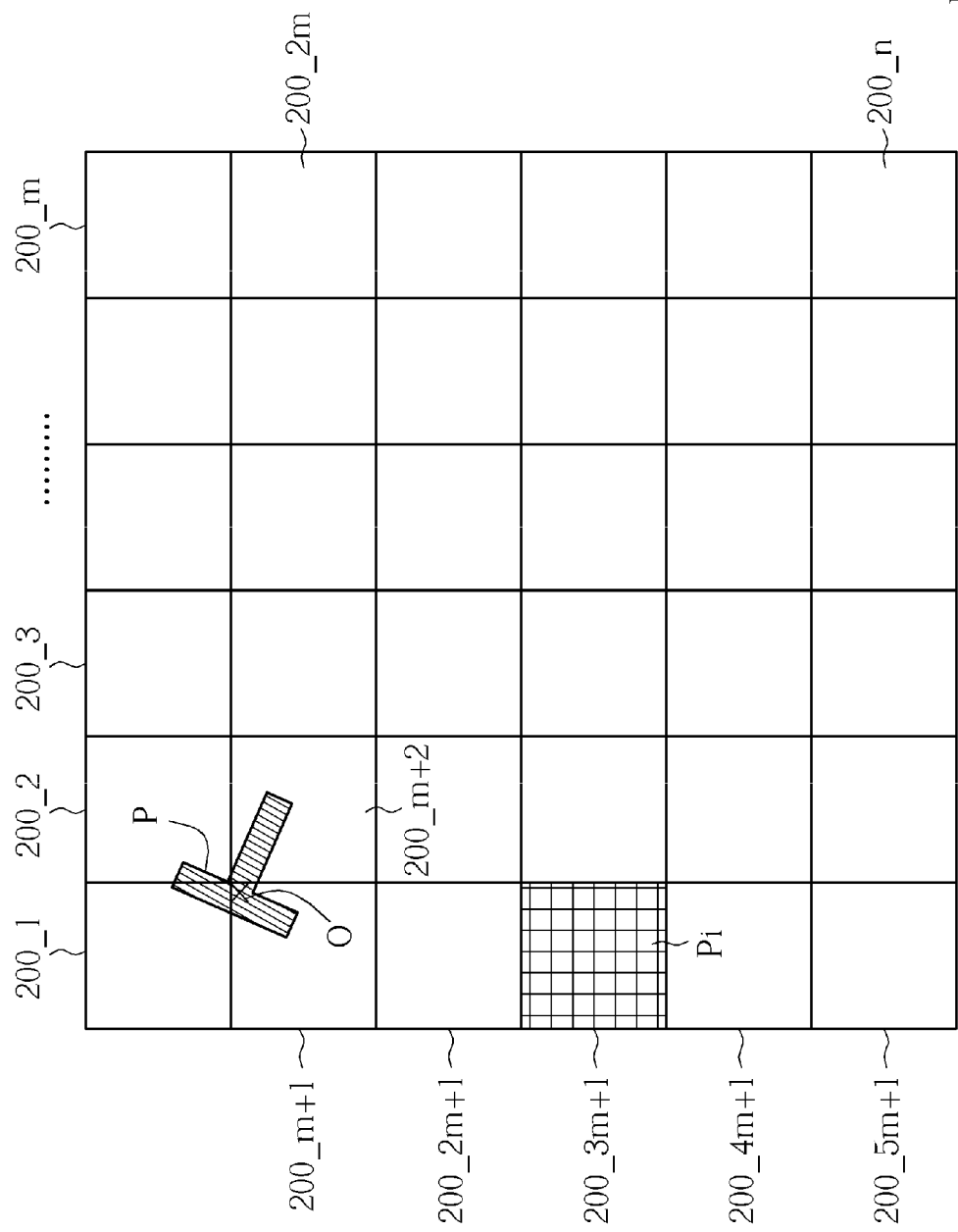
FIG. 2 is a concept diagram illustrating how to determine first dimensional information and second dimensional information according to the method of the present invention.
Figure 3:
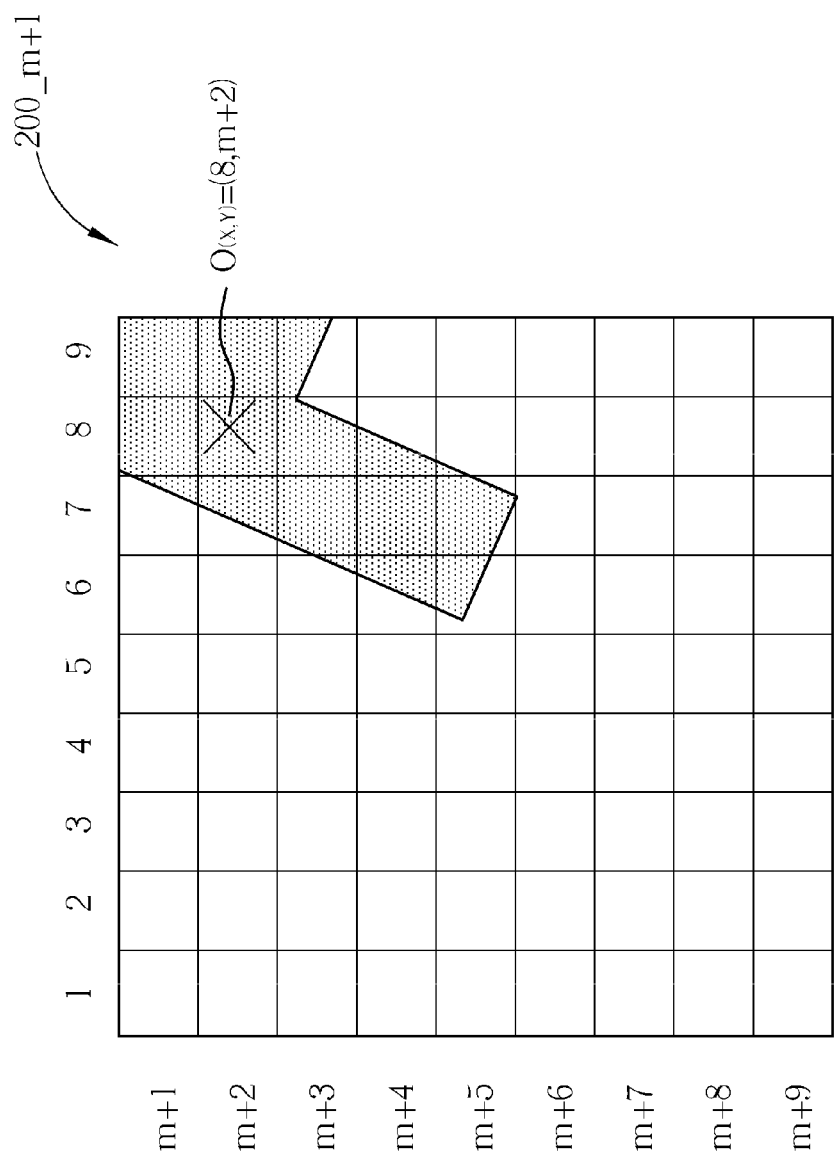
FIG. 3 is another concept diagram illustrating how to determine the first dimensional information and the second dimensional information according to the method of the present invention.

At the initial operation of the method of the present invention, a sensed image SeF that includes the projection image P is generated via the sensor array 120, and the sensed image Sef includes a plurality of pixels, wherein each pixel corresponds to a plurality of brightness values instantly generated by the sensor array 120 (i.e., respectively generated by sensing units of the pixel). Next, please refer to FIG. 2, which illustrates how to determine the first dimensional information X and the second dimensional information Y included in the space status information of the pointing device 110. Basically, the first dimensional information X and the second dimensional information Y represent a projection position of the central point of the pointer 115 within the pointing device 110 mapped onto the sensor array 120. To obtain the first dimensional information X and the second dimensional information Y, the method of the present invention calculates a plurality of sum of sensed values respectively corresponding to a plurality of first sensing areas 200_1-200_n within the sensed image Sef, wherein each of the first sensing areas 200_1-200_n further includes a plurality of pixels Pi (FIG. 2 only shows the pixels in the first sensing area 200_3m+). The first sensed value is derived from calculating a sum of brightness values of the pixels within the first sensing area. After the first sensed value in each first sensing area is calculated, the first dimensional information X and the second dimensional information Y of the space status information are determined. Next, the method of the present invention determines a maximum value among the first sensed values. For example, since the position of the projection image P is substantially at the first sensing areas 200_1, 200_2, 200_m+1 and 200_m+2, the first sensing areas theoretically include larger first sensed values. Moreover, the portion of the first sensing area 200_m+1 which includes part of the projection image P is close to the central point O, the portion would have a larger brightness value. Therefore, the first sensed value of the first sensing area 200_m+1 would be larger than the first sensed values of the first sensing areas 200_1, 200_2 and 200_m+2. Thus, after the first sensing area 200_m+1 that has the largest first sensed value is determined, the first dimensional information X and the second dimensional information Y may be determined. Please refer to FIG. 3 for details directed to determining the first dimensional information X and the second dimensional information Y.

After the first sensing area 200_m+1 is selected, the brightness value of each pixel of the selected first sensing area 200_m+1 is observed. Since the central point O of the projection image P (which corresponds to the central point of the pointer 115 of the pointing device 110 and therefore has the largest projection beam intensity) lies at the position of the pixel (8, m+2). Therefore, this pixel (8, m+2) has the largest brightness value. The method of the present invention utilizes a related position (8, m+2) of the pixel that has the largest brightness value within the selected first sensing area to determine that the first dimensional information X and the second dimensional information Y of the pointing device 110 at this moment is (8, m+2).

Figure 4:
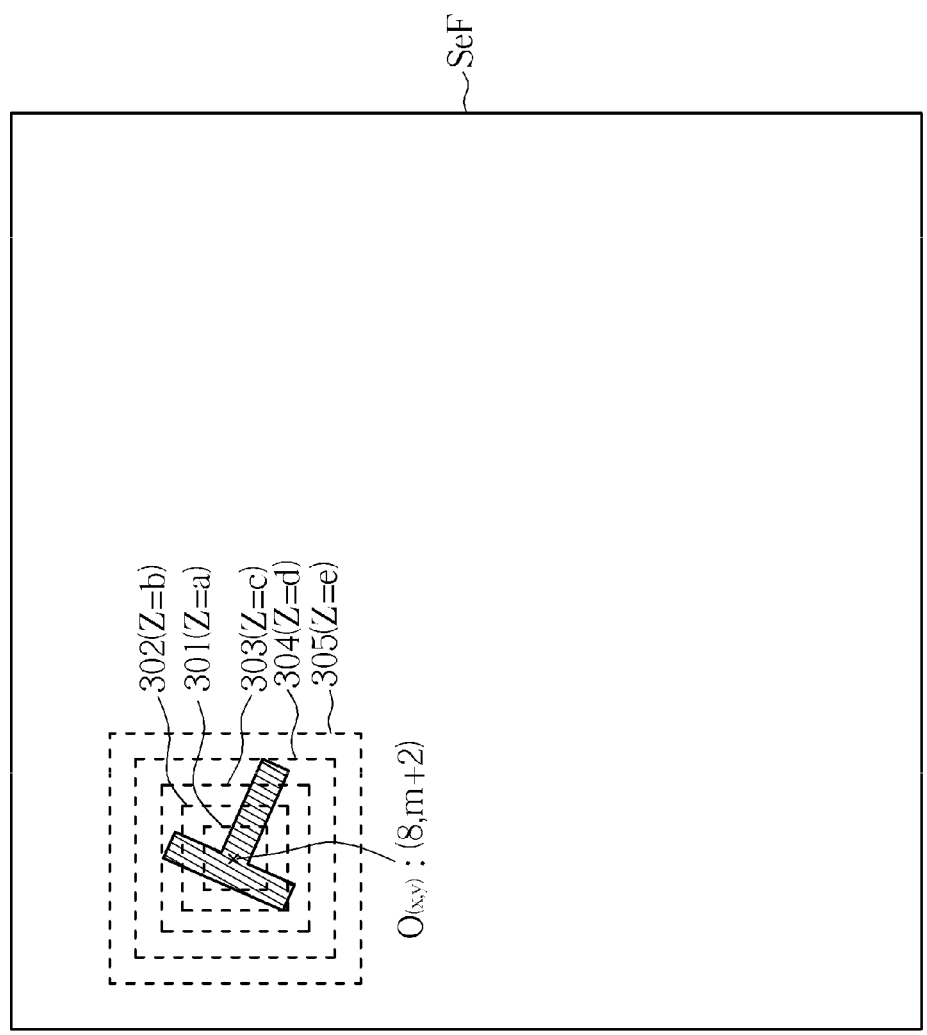
FIG. 4 is a concept diagram illustrating how to determine third dimensional information according to the method of the present invention.

Next, after the first dimensional information X and the second dimensional information Y is determined, the third dimensional information Z of the space status information may be determined according to the first dimensional information X and the second dimensional information Y. Please refer to FIG. 4 for details directed to determining the third dimensional information Z. As shown in the figure, since the third dimensional information Z represents the distance between the pointing device 110 and the sensor array 120. Therefore, the value corresponding to the third dimensional information Z may be derived according to the size of the projection image P. The present invention determines the size of the projection image P according to a second sensing area whose size is increased progressively, such that the third dimensional information Z is determined. Initially, the method of the present invention establishes an initial size 301 of a second sensing area within the sensed image SeF where the second sensing area may correspond to the minimum value a of the third dimensional information Z, and the central point of the initial size 301 of the second sensing area is the central point position P (8, m+2) of the projection image P. Next, a second sensed value S1 within the initial size 301 of the second sensing area (it may be derived by calculating the sum of the brightness values of pixels within the second sensing area having the initial size 301). Next, the initial size 301 of the second sensing area is adjusted to obtain an adjusted current size 302 of the second sensing area (which may correspond to the value b of the third dimensional information Z), and then the sum of the brightness values of pixels within the second sensing area having the current size 302 is calculated to act as the second sensed value S2. Next, the method of the present invention compares a difference between the second sensed values S1 and S2 with a threshold value. When the difference is smaller than the threshold value, it implies that the projection image P included in the second sensing area with the current size 302 is substantially the same as the projection image P included in the second sensing area with the initial size 301. In other words, the second sensing area with the initial size 301 already includes most part of the projection image P. Therefore, the third dimensional information Z of the projection image P is the value a corresponding to the initial size 301.

However, if the difference between the second sensed values S1 and S2 is larger than the threshold value, it implies that a portion of the projection image P included in the second sensing area with the current size 302 is quite different from a portion of the projection image P included in the second sensing area with the initial size 301. Therefore, the current size 302 of the second sensing area needs further adjustment to generate a larger size 303 of the second sensing area (which may correspond to the value c of the third dimensional information Z under a condition where a central point still remains at (8, m+2)), and then the second sensed value S3 is calculated. The difference between the second sensed values S3 and S2 still needs to be compared with the threshold value to determine whether the current size 302 of the second sensing area should be further adjusted, or the third dimensional information Z can be set by the value c. In the exemplary embodiment represented by FIG. 4, if the size of the second sensing area is continually adjusted to be the size 305 of the second sensing area as it is found that the second sensed value S4 corresponding to the size 304 is substantially the same as the second sensed value S5 corresponding to the size 305 of the second sensing area, the value of the third dimensional information Z is set by the value d corresponding to the size 304.

Figure 5:
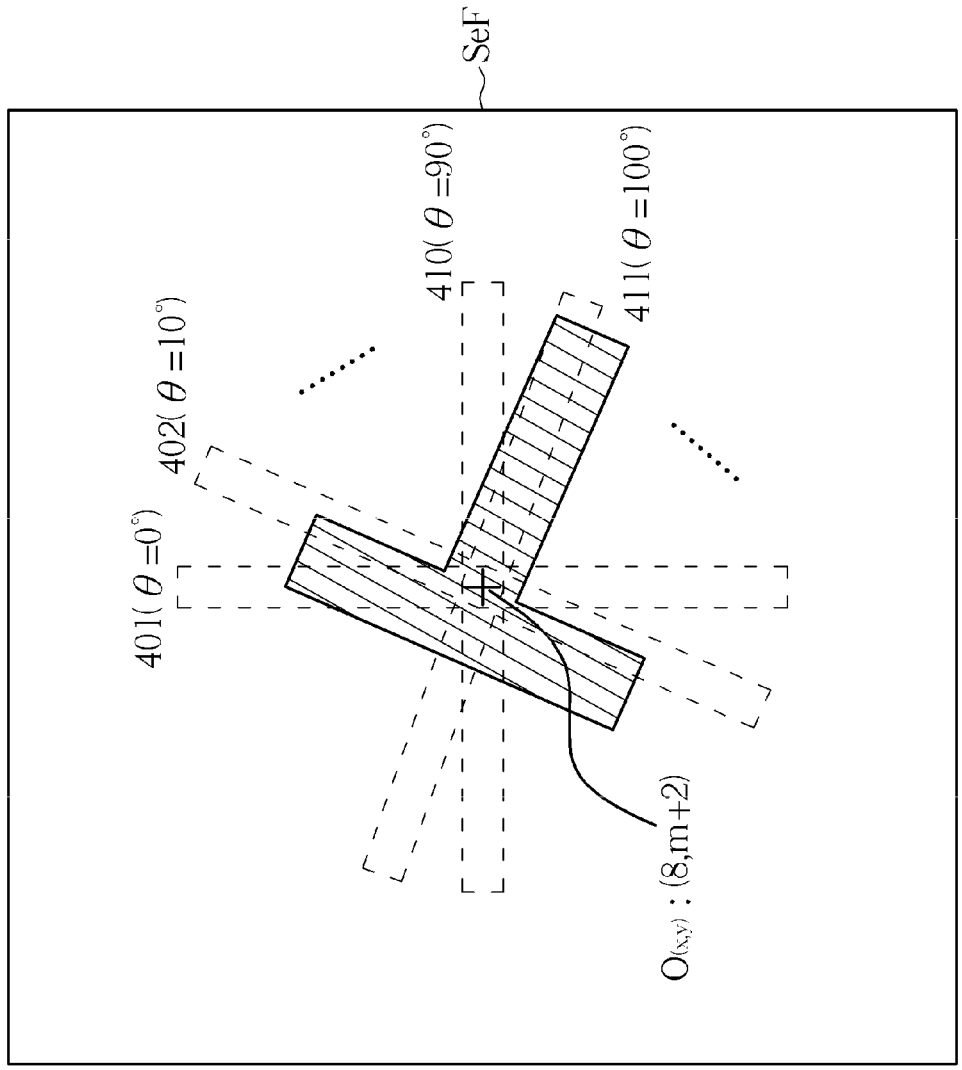
FIG. 5 is a concept diagram illustrating how to determine rotation information according to the method of the present invention.

In addition, the method of the present invention further calculates the rotation information θ. Please refer to FIG. 5 which illustrates how to calculate the rotation information θ. Firstly, the method of the present invention determines a plurality of third sensing areas (only 401, 402, 410, and 411 are shown in the figure) with a rotation relationship in the sensed image SeF according to the first dimensional information X and the second dimensional information Y (e.g., (8, m+2)) of the pointing device 110, wherein the third sensing areas are rotated around the central point (8, m+2), and the adjacent sensing areas are spaced by a 10-degree rotation (Please note that this value and related process and result resulted from this value are not meant to be limitations to the present invention). Therefore, the rotation information θ corresponding to the third sensed information 401 is 0 degree. The rotation information θ corresponding to the third sensed information 402 is 10 degrees, the rotation information θ corresponding to the third sensed information 410 is 90 degrees, the rotation information θ corresponding to the third sensed information 411 is 100 degrees, and so forth. Next, the method of the present invention calculates third sensed values respectively corresponding to the third sensing areas, wherein calculating each third sensed value is to calculate a sum of brightness values of a plurality of pixels included within a corresponding third sensing area.

Moreover, after all the third sensed values are calculated, the present invention determines a maximum value from the third sensed values, wherein the maximum value corresponds to a specific third sensing area, and the rotation angle corresponding to the specific third sensing area is used to serve as the rotation information θ. For example, in the exemplary embodiment of FIG. 5, the third sensed value corresponding to the third sensing area 403 is the maximum value because the third sensing area 403 includes most part of the projection image P. Thus, the rotation information θ of the current pointing device 110 is equal to 100 degrees. However, it should be noted that the angle spacing mentioned above is one of the exemplary implementations of the present invention, and is not meant to be a limitation of the present invention. In other exemplary embodiments of the present invention, other angle spacing may be employed.

In order to accelerate the calculation of the rotation information θ, the method of the present invention utilizes a look-up table to record a plurality of pixel permutation patterns respectively mapped to a plurality of different rotation angles, and utilizes the pixel permutation patterns to generate the third sensing areas. Please refer to FIG. 6 which illustrates this accelerating manner for the calculation of the rotation information θ. For example, the matrix A corresponds to a pixel permutation with a rotation angle being 0 degree. When the matrix D that is composed of brightness values of 7*7 pixels with a central point at (8, m+2) is multiplied with the matrix A (At this time, the brightness value of the central point (8, m+2) is a25, and the relationship between pixel brightness values and other matrix elements may be derived correspondingly), the third sensed value of the third sensing area 401 which corresponds to the 0-degree rotation angle is derived. In other words, the matrix A corresponds to the third sensing area 401 equivalently). If the matrix D is multiplied with the matrix, the third sensed value of the third sensing area which corresponds to the 40-degree rotation angle is derived. If the matrix D is multiplied with the matrix C, the third sensed value of the third sensing area 410 which corresponds to the 90-degree rotation angle is derived. In other words, the look-up table records a plurality of matrices corresponding to a plurality of different rotation angles, respectively. A specific third sensing area that has the maximum third sensed value may be determined via these matrices, and the corresponding specific rotation angle may be used to serve as the angle value corresponding to the rotation information θ. This represents that the most part of the projection image P is included within the specific third sensing area, so the rotation angle of the projection image P is similar to the rotation angle of the specific third sensing area. Thus, the rotation angle of the specific third sensing area may represent the rotation angle of the projection image P and serve as the rotation information θ of the pointing device 110.

Figure 7:
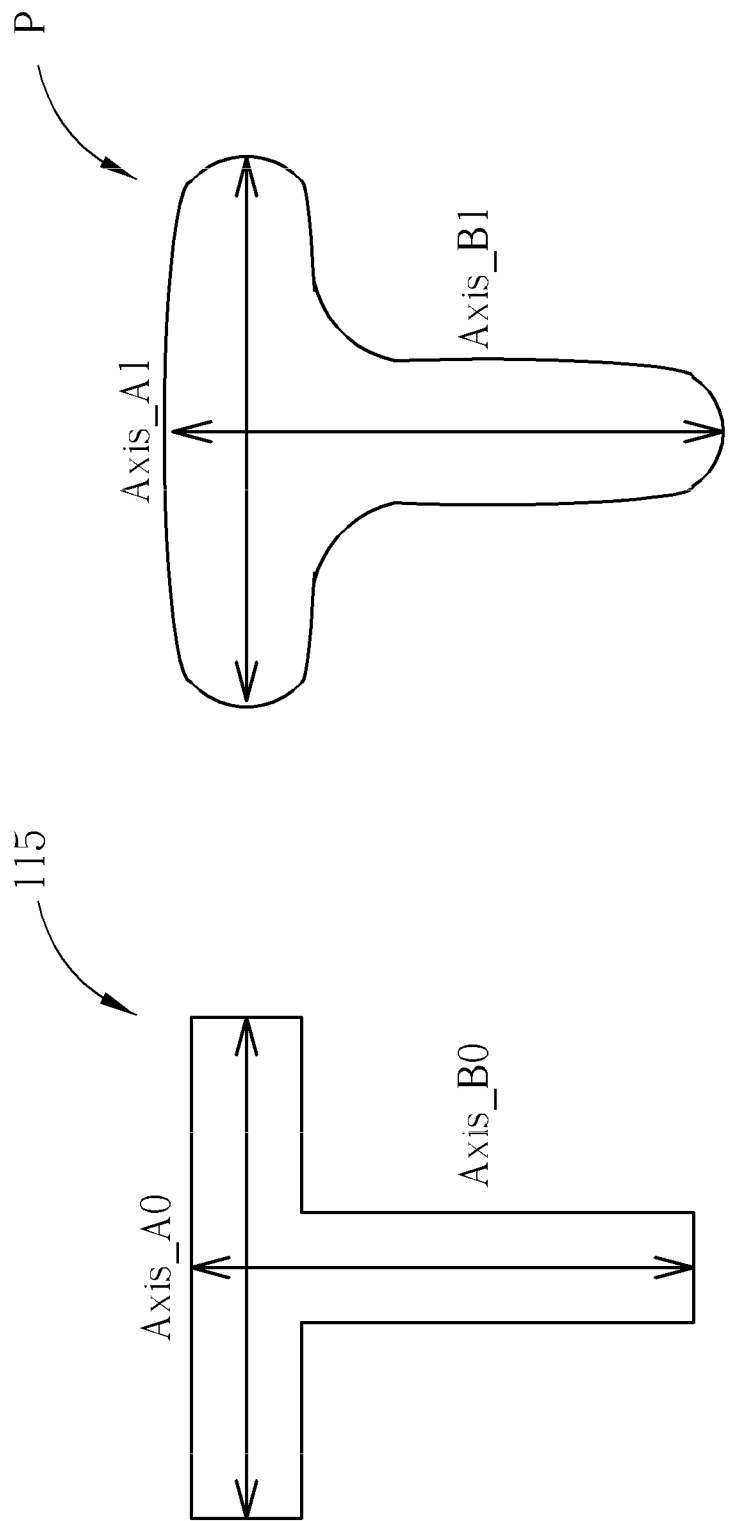
FIG. 7 is a concept diagram illustrating how to determine tilt information according to the method of the present invention.

Please refer to FIG. 7 which illustrates the determining manner for the tilt information φ of the pointing device 110, wherein the tilt information φ is mainly determined according to a geometry ratio of the projection image P. The present invention first calculates lengths of a first axis Axis_A1 and a second axis Axis_B1 of the projection image P, and then derives the ratio value RP of the two axes Axis_A1 and Axis_B1. Moreover, the present invention calculates lengths of a first axis Axis_A0 and a second axis Axis_B0 of the pointer 115 of the pointing device 110, and then derives the ratio value R1 of the two axes Axis_A0 and Axis_B0. The main concept thereof is that when the light beam generated by the pointing device 110 is not perpendicular to the sensor array 120 (or display panel 125), the geometry ratio value RP of the projection image P is not equal to the geometry ratio value R1 of the pointer 115. Therefore, the tilt information φ of the pointing device 110 may be derived from comparing the geometry ratio values RP and R1. In order to accelerate the calculation of the tilt information φ, the present invention further utilizes a look-up table which records the relationship between the tilt angle and the ratio value RP under a constant ratio value R1 (i.e., the shape of the pointer 115 of the pointing device 110 is fixed). In practice, the present invention may select a look-up table corresponding to the ratio value R1 of the current pointer 115 from a plurality of look-up tables that correspond to different ratio values R1, and the selected look-up table records a plurality of predetermined ratio values RR1-RRn respectively mapped to a plurality of different tilt angles. Moreover, the present invention compares the ratio value RP with the predetermined ratio values RR1-RRn to determine a most suitable tilt angle, and uses the determined tilt angle to act as the tilt information φ of the pointing device 110.

The tilt angle of the pointing device 110 may further affect the accuracy of determining other space status information due to the fact that when the pointing device 100 is under an over-tilted state, the projection image P fails to be fully generated onto the sensor array 120. That is, part of the projection image P will be formed beyond the coverage of the sensor array 120. Consequently, the tilt angle corresponding to the pointing device 110 cannot be determined correctly. Therefore, in one exemplary embodiment of the present invention, when the tilt angle corresponding to the tilt information φ is larger that a predetermined value, the present invention will stop the steps for determining other space status information.

Figure 9:
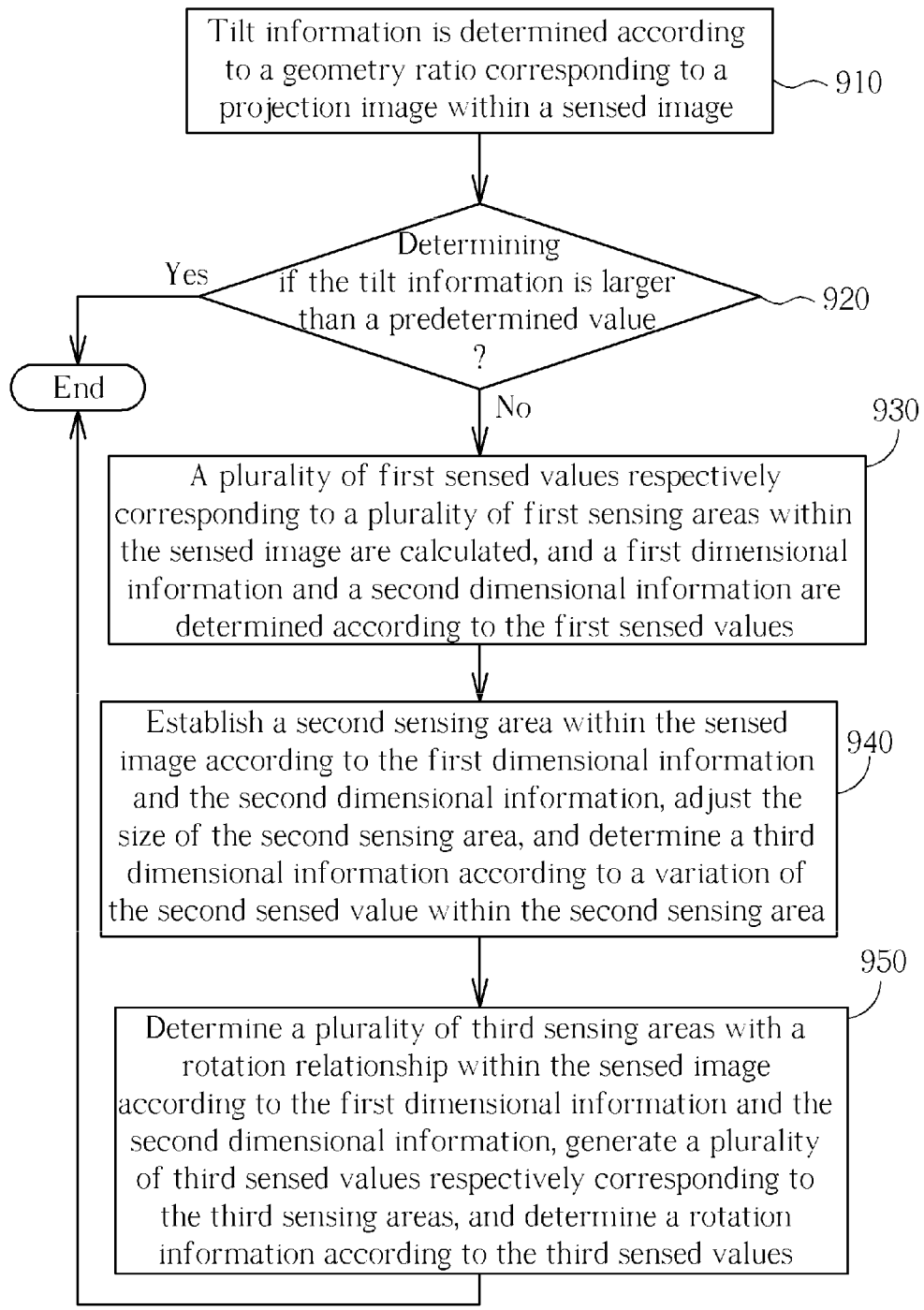
FIG. 9 is a flowchart illustrating an exemplary embodiment of the method of the present invention.
Figure 10:
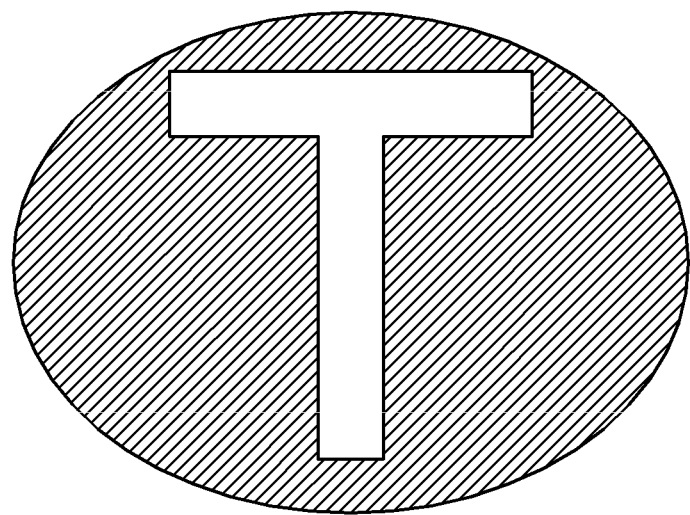
FIG. 10 illustrates a first pattern of the pointer within the 3D pointing system which employs the method of the present invention.
Figure 11:
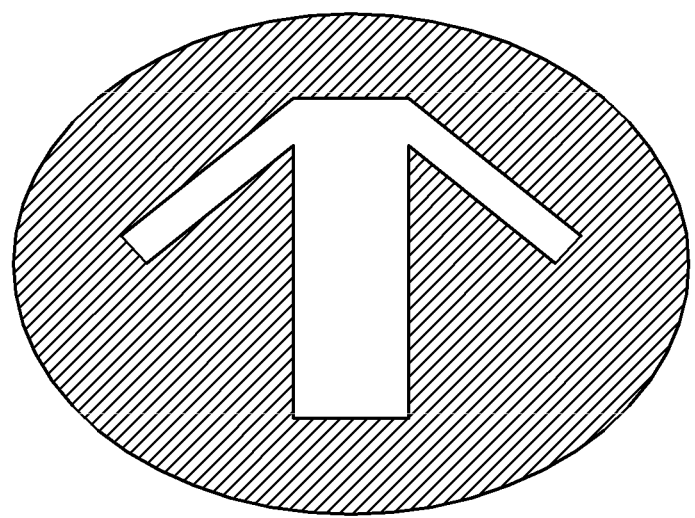
FIG. 11 illustrates a second pattern of the pointer within the 3D pointing system which employs the method of the present invention.
Figure 12:
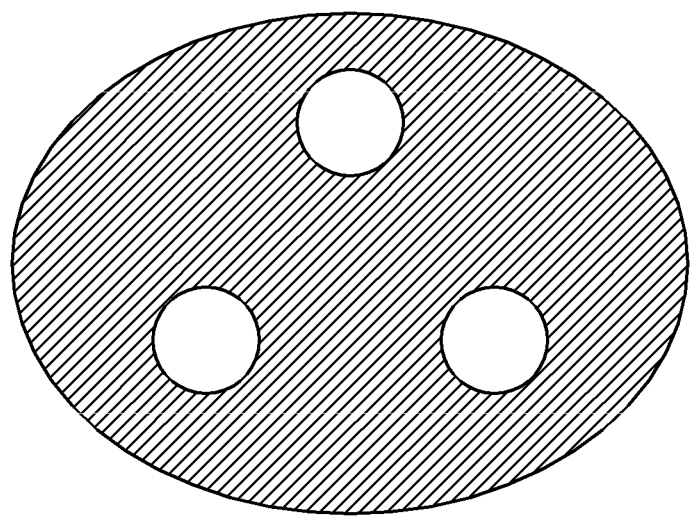
FIG. 12 illustrates a third pattern of the pointer within the 3D pointing system which employs the method of the present invention.
Figure 13:
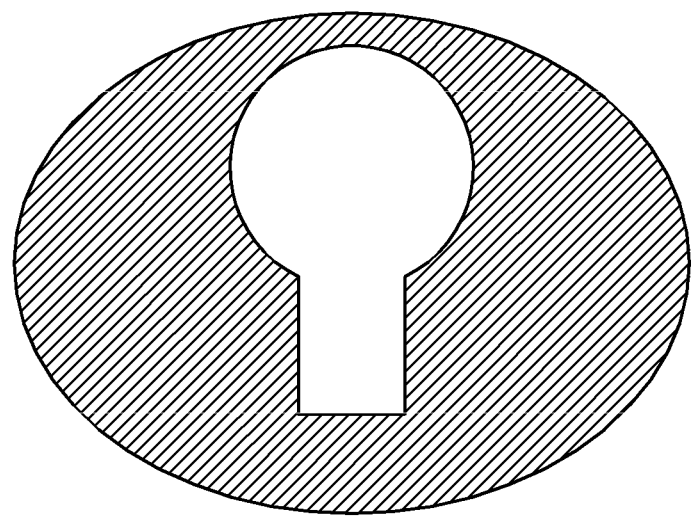
FIG. 13 illustrates a fourth pattern of the pointer within the 3D pointing system which employs the method of the present invention.
Figure 14:
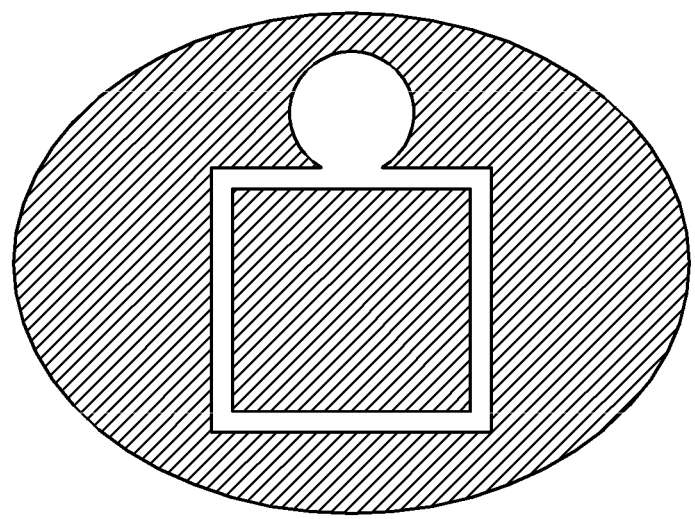
FIG. 14 illustrates a fifth pattern of the pointer within the 3D pointing system which employs the method of the present invention.

According to an exemplary embodiment, the method of the present invention may be concluded as the flowchart shown in FIG. 9. Please refer to FIG. 9. In order to improve the accuracy of the space status information, the present invention determines the tilt information in the beginning. Therefore, in step 910, tilt information is determined according to a geometry ratio corresponding to a projection image within a sensed image. Next, in step 920, the tilt information is checked to see if the tilt information is larger than a predetermined value. If true, it implies that the pointing device is over tilted, and the method of the present invention is ended here; otherwise, the flow proceeds with step 930. In the step 930, a plurality of first sensed values respectively corresponding to a plurality of sum of pixels value of various sensing areas and the maximum value of the sum is obtained. The first sensed value is decided by the maximum value of the sum, and a first dimensional information and a second dimensional information are determined according to the first sensed values. The first dimensional information and the second dimensional information are at the center of the first sensing value. Next, the flow proceeds with step 940 to establish a second sensing area within the sensed image according to the first dimensional information and the second dimensional information, adjust the size of the second sensing area, and determine a third dimensional information included in the at least one space status information according to a variation of the second sensed value within the second sensing area. Finally, the flow proceeds with step 950 to determine a plurality of third sensing areas with a rotation relationship within the sensed image according to the first dimensional information and the second dimensional information, generate a plurality of third sensed values respectively corresponding to the third sensing areas, and determine a rotation information according to the third sensed values. Besides, in order to improve the accuracy of the space information obtained by the method of the present invention, an exemplary embodiment of the present invention may perform extra signal processing (e.g., background noise reduction) upon the sensed image after obtaining the sensed image. After the extra signal processing is accomplished, the processed sensed image is used for determining the space information.

Moreover, it should be noted that, the pointer 115 has a pointing function and therefore has an asymmetric pattern such as T-shaped pattern. However, in other exemplary embodiments of the present invention, the pointer 115 may be realized via other patterns. Some of the possible patterns are shown in FIG. 10-FIG. 14. For example, the pointer 115 may be an arrow-shaped pattern shown in FIG. 11. Therefore, in the following operation, the sensing plane of the sensor array 120 generates a sensed image of a projection image which includes an arrow-like image, and the method of the present invention determines the space status information of the pointing device 110 according to the sensed image. In other words, the pointer patterns shown in FIG. 10-FIG. 14 are all suitable for the present invention. Therefore, the pointer patterns shown in the specification and drawings are not meant to be limitations to the application of the method of the present invention. Generally, the method of the present invention utilizes a projection image generated by the pointer that has a specific pattern to determine the space status information. Thus, any technical means obeying the operational concept of the present invention falls within the scope of the present invention, and the present invention is not limited to a pointer with a specific pattern.

To sum up, the 3D pointing system may provide intuitive operational experience for the user; however, due to different structures of the 3D pointing system, location calculation of the pointing device according to the current prior art still has room for improvement. The present invention therefore provides a quite accurate and effective method for obtaining space information of the pointing device.

Those skilled in the art will readily observe that numerous modifications and alterations of the device and method may be made while retaining the teachings of the invention.

What is claimed is:

1. A method utilized in a three-dimensional pointing system, the three-dimensional system having a pointing device, a display panel and a sensor array, the sensor array being embedded within the display panel, the method comprising:
   utilizing the pointing device for projecting a pointer onto the display panel to form a projection image;
   utilizing the sensor array for generating a sensed image which comprises the projection image, wherein the sensed image has a plurality of pixels;
   calculating a plurality of first sensed values respectively corresponding to a plurality of first sensing areas within the sensed image, comprising:
      calculating a sum of a plurality of brightness values of a plurality of pixels included in each of the first sensing area, and accordingly generating a first sensed value corresponding to each of the first sensing area; and
   determining first dimensional information and second dimensional information of at least one space status information according to the first sensed values.

2. The method of claim 1, wherein the step of determining the first dimensional information and the second dimensional information comprises:
   determining a maximum value among the first sensed values;
   determining a specific pixel that has a maximum brightness value within a specific first area corresponding to the maximum value; and
   determining the first dimensional information and the second dimensional information according to position information corresponding to the specific pixel.

3. The method of claim 1, further comprising:
determining tilt information of the at least one space status information according to a geometric ratio corresponding to the projection image within the sensed image.

4. The method of claim 3, further comprising:
referring to the tilt information for determining if a step of determining other space status information is performed.

5. The method of claim 1, wherein the pointer has an asymmetric pattern.

6. The method of claim 5, wherein the asymmetric pattern is a non-shaded portion one of a plurality of patterns respectively shown in FIG. 10-FIG. 14.

7. A method utilized in a three-dimensional pointing system, the three-dimensional system having a pointing device, a display panel and a sensor array, the sensor array being embedded within the display panel, the method comprising:
utilizing the pointing device for projecting a pointer onto the display panel to form a projection image;
utilizing the sensor array for generating a sensed image which comprises the projection image, wherein the sensed image has a plurality of pixels;
calculating a plurality of first sensed values respectively corresponding to a plurality of first sensing areas within the sensed image;
determining first dimensional information and second dimensional information of at least one space status information according to the first sensed values;
establishing a second sensing area within the sensed image according to the first dimensional information and the second dimensional information; and
adjusting a size of the second sensing area, and determining third dimensional information of the at least one space status information according to a variation of a second sensed value within the second sensing area.

8. The method of claim 7, wherein the step of determining the third dimensional information comprises:
generating the second sensed value corresponding to an initial size of the second sensing area according to brightness values of a plurality of pixels within the second sensing area with the initial size;
adjusting the initial size of the second sensing area for obtaining a current size of the second sensing area; and
performing third dimensional information generating operation, comprising:
generating the second sensed value corresponding to the current size of the second sensing area according to brightness values of a plurality of pixels within the second sensing area with the current size;
when a difference between the second sensed value corresponding to the current size of the second sensing area and a second sensed value corresponding to a previous size of the second sensing area is smaller than a threshold value, determining the third dimensional information according to the current size of the second sensing area; and
when the difference between the second sensed value corresponding to the current size of the second sensing area and the second sensed value corresponding to the previous size of the second sensing area is not smaller than the threshold value, updating the current size of the second sensing area, and performing the third dimensional information generating operation again.

9. The method of claim 8, wherein the step of generating the second sensed value corresponding to the initial size of the second sensing area comprises: generating the second sensed value corresponding to the initial size of the second sensing area by calculating a sum of the brightness values of the pixels within the second sensing area with the initial size; and the step of generating the second sensed value corresponding to the current size of the second sensing area comprises: generating the second sensed value corresponding to the current size of the second sensing area by calculating a sum of the brightness values of the pixels within the second sensing area with the current size.

10. A method utilized in a three-dimensional pointing system, the three-dimensional system having a pointing device, a display panel and a sensor array, the sensor array being embedded within the display panel, the method comprising:
utilizing the pointing device for projecting a pointer onto the display panel to form a projection image;
utilizing the sensor array for generating a sensed image which comprises the projection image, wherein the sensed image has a plurality of pixels;
calculating a plurality of first sensed values respectively corresponding to a plurality of first sensing areas within the sensed image;
determining first dimensional information and second dimensional information of at least one space status information according to the first sensed values
determining a plurality of third sensing areas with a rotation relationship according to the first dimensional information and the second dimensional information;
generating a plurality of third sensed values respectively corresponding to the third sensing areas; and
determining rotation information of the at least one space status information according to the third sensed values.

11. The method of claim 10, wherein the step of determining the third sensing areas with the rotation relationship according to the first dimensional information and the second dimensional information comprises:
providing a look-up table which stores a plurality of pixel permutation patterns respectively mapped to a plurality of different rotation angles; and
in the sensed image, determining the third sensing areas respectively corresponding to the different rotation angles according to the look-up table, the first dimensional information and the second dimensional information.

12. The method of claim 11, wherein the step of generating the third sensed values respectively corresponding to the third sensing areas comprises: calculating a sum of brightness values of a plurality of pixels included in each of the third sensing areas as a third sensed value of each of the third sensing areas; and the step of determining the rotation information of the at least one space status information according to the third sensed value comprises:
determining a maximum value among the third sensed values, wherein the maximum value corresponds to a specific third sensing area; and
determining the rotation information according to a rotation angle corresponding to the specific third sensing area.

13. A method utilized in a three-dimensional pointing system, the three-dimensional system having a pointing device, a display panel and a sensor array, the sensor array being embedded within the display panel, the method comprising:
utilizing the pointing device for projecting a pointer onto the display panel to form a projection image;
utilizing the sensor array for generating a sensed image which comprises the projection image, wherein the sensed image has a plurality of pixels;

calculating a first ratio value of a length corresponding to a first axis of the pointer to a length corresponding to a second axis of the pointer;

calculating a second ratio value of a length corresponding to a first axis of the projection image within the sensed image to a length corresponding to a second axis of the projection image within the sensed image; and determining tilt information of the at least one space status information according to a relationship between the first ratio value and the second ratio value.

14. The method of claim 13, wherein the step of determining the tilt information according to the relationship between the first ratio value and the second ratio value comprises:

selecting a look-up table according to the first ratio value, wherein the look-up table stores a plurality of predetermined second ratio values respectively mapped to a plurality of tilt angles; and determining a specific tilt angle from the look-up table according to the second ratio value and the predetermined second ratio values; and determining the tilt information according to the specific tilt angle.

\* \* \* \* \*